United States Patent
Delespierre et al.

(10) Patent No.: US 7,625,546 B2
(45) Date of Patent: Dec. 1, 2009

(54) PRECURSOR COMPOUNDS OF ALKALINE EARTH METAL OR RARE EARTH METAL ALUMINATES METHOD PRODUCTION AND USE THEREOF PARTICULARLY AS PRECURSORS FOR LUMINOPHORES

(75) Inventors: Benjamin Delespierre, Margny-les-Compiègne (FR); Cédric Froidefond, Paris (FR); Thierry Le Mercier, Paris (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 267 days.

(21) Appl. No.: 10/558,108

(22) PCT Filed: May 19, 2004

(86) PCT No.: PCT/FR2004/001240

§ 371 (c)(1),
(2), (4) Date: Aug. 9, 2006

(87) PCT Pub. No.: WO2004/106263

PCT Pub. Date: Dec. 9, 2004

(65) Prior Publication Data

US 2006/0273286 A1    Dec. 7, 2006

(30) Foreign Application Priority Data

May 23, 2003   (FR) ................... 03 06247

(51) Int. Cl.
C04B 35/44   (2006.01)
(52) U.S. Cl. ............... 423/600; 423/263; 252/301.4 R; 501/152; 501/127; 501/153
(58) Field of Classification Search ........... 423/600, 423/263; 252/301.4 R; 501/153, 127, 152
See application file for complete search history.

(56) References Cited

U.S. PATENT DOCUMENTS

| | | | |
|---|---|---|---|
| 4,379,638 A | 4/1983 | Prudhon et al. | |
| 4,970,030 A | 11/1990 | Prudhon et al. | |
| 6,168,731 B1 * | 1/2001 | Hampden-Smith et al. | 252/301.4 S |
| 6,180,029 B1 * | 1/2001 | Hampden-Smith et al. | 252/301.4 R |
| 6,482,387 B1 | 11/2002 | Gülgün et al. | |
| 6,555,958 B1 | 4/2003 | Srivastava et al. | |
| 2001/0042853 A1 | 11/2001 | Hampden-Smith et al. | |

FOREIGN PATENT DOCUMENTS

| | | |
|---|---|---|
| FR | 2 257 326 | 8/1975 |
| FR | 2 419 754 | 10/1979 |
| FR | 2 431 321 | 2/1980 |
| KR | 2001-39371 | 10/1999 |
| KR | 2001-38294 | 6/2001 |
| WO | WO 02/094716 | 11/2002 |
| WO | WO 03/102113 | 12/2003 |

OTHER PUBLICATIONS

Y. C. Kang et al., "YAG: Ce phosphor particles prepared by ultrasonic spray pyrolysis", Materials Research Bulletin, vol. 35, 2000, pp. 789-798.
Y. C. Kang et al., "Preparation of YAG: Europium Red Phosphors by Spray Pyrolysis Using a Filter-Expansion Aerosol Generator", J. Am. Ceram. Soc., vol. 82, 1999, pp. 2056-2060.
S. Brunauer et al., "Adsorption of Gases in Multimolecular Layers", The Journal of the American Chemical Society, vol. 60, Feb. 1938, pp. 309-319.

* cited by examiner

Primary Examiner—C. Melissa Koslow
(74) Attorney, Agent, or Firm—Buchanan, Ingersoll & Rooney P.C.

(57) ABSTRACT

The invention relates to alkaline-earth or rare-earth metal aluminate precursor compounds, to their method of preparation and to their use in particular as phosphor precursors. These alkaline-earth or rare-earth metal aluminate precursor compounds are essentially crystallized in the form of a transition alumina and in the form of substantially spherical and chemically homogeneous particles including pores whose mean diameter is of at least 10 nm.

28 Claims, 2 Drawing Sheets

PRECURSOR COMPOUNDS OF ALKALINE EARTH METAL OR RARE EARTH METAL ALUMINATES METHOD PRODUCTION AND USE THEREOF PARTICULARLY AS PRECURSORS FOR LUMINOPHORES

This application is an application under 35 U.S.C. Section 371 of International Application Number PCT/FR2004/001240 filed on May 19, 2004.

The present invention relates to alkaline-earth or rare-earth metal aluminate precursor compounds, to their method of preparation and to their use in particular as phosphor precursors.

Many manufactured products incorporate phosphors in their manufacture. These phosphors are able to emit light whose color and intensity depend on the excitation that they undergo. They are also widely used in various types of color displays and in lamps.

These products are generally obtained from a mixture of salts or oxides of various constituents by heating them at high temperature in the presence of a fluxing agent or flux. To obtain effective phosphors, this method of preparation generally requires high temperatures, especially above 1400° C., for example around 1600° C., and results in products of large particle size often with a very broad particle size distribution. Additional milling or deagglomerating operations are then needed in order to obtain a product of smaller particle size.

There are also methods that result in phosphors by aerosol pyrolysis at calcinations temperatures for example, between 1400° C. and 1500° C. These methods provide products at lower temperatures, but directly give phosphors of well-defined characteristics. Now, it would be beneficial to be able to have an initial or precursor product which, on the one hand, makes it possible to obtain final products and/or phosphors at a relatively low temperature and which, on the other hand, offers the possibility of resulting, via a simple heat treatment step, without the addition of raw materials other than the flux, in products or phosphors whose characteristics can be varied and controlled, for example in terms of their morphology, according to the conversion conditions, especially whether a flux is present or not.

The object of the invention is to develop such a precursor product.

For this purpose, the alkaline-earth or rare-earth metal aluminate precursor compound of the invention has the following characteristics:

it has a composition given by the formulae:

$$a(M^1O).b(MgO).c(Al_2O_3) \quad (1)$$

or

$$a(M^2O_{1.5}).b(MgO).c(Al_2O_3) \quad (2)$$

in which $M^1$ denotes an alkaline-earth metal and $M^2$ denotes yttrium or a combination of cerium and terbium, and a, b and c are integers or nonintegers that satisfy the relationships:

$0.25 \leq a \leq 4$; $0 \leq b \leq 2$ and $0.5 \leq c \leq 9$;

it is essentially crystallized in the form of a transition alumina;
it is in the form of substantially spherical and chemically homogeneous particles; and
these particles include pores, the mean diameter of which is at least 10 nm.

The invention also relates to a method of preparing such an aluminate precursor, which is characterized in that it comprises the following steps:

a liquid mixture comprising aluminum compounds and compounds of the other elements involved in the precursor composition is formed;
said mixture is spray-dried; and
the dried product is calcined at a temperature of between 700° C. and 950° C.

The precursor compound of the invention may result, depending on its composition, in a crystallized product, especially a phosphor, after calcination above 1200° C.

Other features, details and advantages of the invention will become even more clearly apparent on reading the following description, given with reference to the appended drawings in which.

Figure 1:
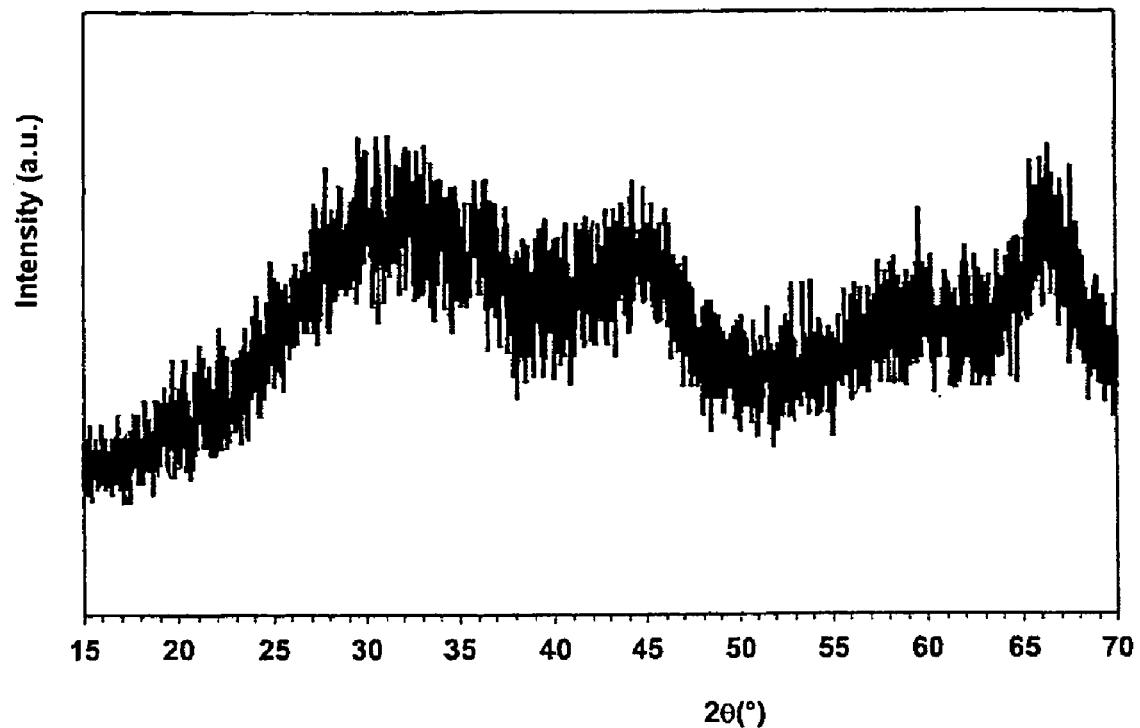
FIG. 1 is an X-ray diagram of a precursor compound according to the invention.

In the rest of the description, the term "rare-earth metal" is understood to mean the elements of the group formed by yttrium and those elements of the Periodic Table of Elements with atomic numbers between 57 and 71 inclusive.

The term "specific surface area" is understood to mean the BET specific surface area determined by nitrogen adsorption in accordance with the ASTM D 3663-78 standard drawn up on the basis of the Brunauer—Emmett—Teller method described in The Journal of the American Chemical Society, 60, 309 (1938).

The term "phosphor" is understood to mean any product that can emit light after having undergone excitation.

It should be pointed out that in the rest of the description, unless otherwise indicated, in the ranges of values given, the values at the limits are included.

The precursor compound of the invention has a composition given by the above formulae (1) and (2).

In the products of formula (1), the alkaline-earth metal may more particularly be barium, calcium or strontium.

The precursor compounds of formula (1) may furthermore contain, in a known manner, additional elements, called "substituents", as these elements are regarded as partially substituting for the constituent elements $M^1$, Mg and Al. These substitutions make it possible in particular to modify the optical properties of the products resulting from the compounds of the invention.

Examples of these substituents will be given below for each constituent element on the basis of what is commonly accepted at the present time in the prior art. This means that it would not be outside the scope of the present invention if a substituent described for a given constituent element in fact subsequently proved to be a substitution for a constituent element other than the one presumed in the present description.

Thus, the alkaline-earth metal may be partly substituted with at least one rare-earth metal, which may especially be europium, neodymium and dysprosium, it being possible for these elements to be taken individually or in combination. Likewise, magnesium may be partially substituted with at least one element chosen from zinc, manganese and cobalt. Finally, aluminum may also be partially substituted with at least one element chosen from gallium, scandium, boron, germanium and silicon.

The quantities of these substituents may vary, in a known manner, within wide ranges, however they must be such that, for the maximum values, the crystallographic structure of the transition alumina of the precursor compound is maintained, which structure constitutes another feature of this precursor and will be described below. Moreover, the minimum quantity of substituent is that below which the substituent no longer produces any effect.

However, in general the quantity of substituent for $M^1$ and for magnesium is at most 30%, more particularly at most 20% and even more particularly at most 10%, this quantity being expressed in at % (substituent/(substituent+$M^1$ or Mg) atomic ratio). For aluminum, this quantity, expressed in the same manner, is generally at most 15%. The minimum quantity of substituent may be at least 0.1% for example.

Examples of aluminate precursor compounds of formula (1) that may be mentioned include more particularly those for which a=1, b=0 and c=1, 6 or 7, and in particular the products of formula: $Sr_{0.99}Eu_{0.01}Al_2O_4$; $Sr_{0.98}Eu_{0.01}Dy_{0.01}Al_2O_4$; $Ba_{0.98}Eu_{0.02}Al_2O_4$; $Ca_{0.99}Eu_{0.01}Al_2O_4$; $Ca_{0.98}Eu_{0.01}Nd_{0.01}Al_2O_4$; $Ba_{0.98}Eu_{0.02}Al_{12}O_{19}$; $Ba_{0.98}Mn_{0.02}Al_{12}O_{19}$; $Sr_{3.9}Eu_{0.1}Al_{14}O_{25}$ and $Sr_{3.98}Eu_{0.01}Dy_{0.01}Al_{14}O_{25}$.

Mention may also be made most particularly of magnesium aluminate precursors, that is to say those of formula (1) for which b is not zero and especially those for which a=b=1 and c=5 or 7 and even more particularly those in which the alkaline-earth metal is barium, that is to say barium-magnesium aluminate precursors. Mention may also be made of the products of formula (3):

$$a(Ba_{1-d}Eu_d).b(MgO).c(Al_2O_3) \quad (3)$$

in which a, b and c are as defined above and satisfy the relationships:

$$0.25 \leq a \leq 2; \ 0 \leq b \leq 2 \ \text{and} \ 3 \leq c \leq 9 \ \text{and} \ 0.01 \leq d \leq 0.3.$$

Thus, examples of this type of product that may be mentioned include those of formula $Ba_{0.9}Eu_{0.1}MgAl_{10}O_{17}$; $Ba_{0.9}Eu_{0.1}Mg_{0.8}Mn_{0.2}Al_{10}O_{17}$; and $BaMgAl_{14}O_{23}$. Mention may also be made of products of formula (1) in which a=1, b=2 and c=8, especially $Ba_{0.8}Eu_{0.2}Mg_{1.93}Mn_{0.07}Al_{16}O_{27}$.

In respect of aluminate precursors of formula (2), these are products based on a rare earth metal, in which yttrium, cerium and terbium may also be substituted with at least one other rare earth metal. What was described above in the case of the substituents also applies here, especially as regards the quantities.

Yttrium may be more particularly substituted with cerium, neodymium or terbium, it being possible, here again, for these elements to be taken individually or in combination.

The invention applies particularly to products of formula (2) in which a=3, b=0 and c=2.5 and in which the rare earth metal is yttrium, such as $Y_{2.95}Tb_{0.05}Al_5O_{12}$; $Y_{2.99}Ce_{0.01}Al_5O_{12}$; $Y_{2.99}Nd_{0.01}Al_5O_{12}$, and to those of formula (2) with a=b=1 and c=5.5, for example $Ce_{0.67}Tb_{0.33}MgAl_{11}O_{19}$. Mention may also be made of the product of formula $Y_{0.99}Ce_{0.01}AlO_3$.

The precursor compound of the invention is crystallized in essentially the form of a transition alumina, which may for example be of the gamma type. This crystallization is demonstrated by X-ray analysis. The word "essentially" is understood to mean that the X-ray diagram may have, apart from the predominant transition alumina phase, one or more minor phases corresponding to impurities. According to a preferred embodiment of the invention, the X-ray diagram shows that only the transition alumina phase is present.

The precursor compound of the invention has a specific morphology, as it takes the form of substantially spherical particles. This morphology may be demonstrated by scanning electron microscopy (SEM).

These particles are well separated and individualized. There is no or little particle agglomeration.

These particles may also have a size that varies widely. According to a preferred embodiment of the invention, the mean particle diameter ($d_{50}$), as defined below, is between 1.5 µm and 20 µm. This mean diameter may more particularly be between 2 µm and 10 µm and even more particularly between 2 µm and 5 µm.

The particle size distribution of the precursor compound of the invention may also be narrow. Thus, the dispersion index σ/m is at most 0.8 and may more particularly be at most 0.6. The term "dispersion index" is understood to mean the ratio:

$$\sigma/m = (d_{84}-d_{16})/2d_{50}$$

in which:

$d_{84}$ is the particle diameter for which 84% of the volume of the population of said particles is formed by particles having a diameter of less than this value;

$d_{16}$ is the particle diameter for which 16% of the volume of the population of said particles is formed by particles having a diameter of less than this value;

$d_{50}$ is the particle diameter for which 50% of the volume of the population of said particles is formed by particles having a diameter of less than this value. Throughout the description, the mean size and the dispersion index are values obtained by employing the laser diffraction technique and using a Coulter particle size analyzer.

The particles of the aluminate according to the invention are also chemically homogeneous. By this it is meant that at least the constituent elements are not present in the compound in the form of a simple physical mixture, for example a mixture of oxides, but on the contrary there are chemical-type bonds between these elements.

Moreover, this chemical homogeneity may be quantified by determining the size of the heterogeneity domains. These are less than 60 nm². This means that there is no difference in the chemical composition of the particles of the precursor of the invention between regions 60 nm² in area.

This homogeneity feature is determined by EDS-TEM analysis. More precisely, the heterogeneity domain is measured by the energy dispersion spectroscopy (EDS) method using a transmission electron microscopy (TEM) nanoprobe.

As seen above, the particles of the precursor compound of the invention are spherical. These spheres are generally solid spheres. This feature may be demonstrated by TEM microtomy.

However, these particles have specific porosity, as this porosity is provided by pores whose mean diameter is at least 10 nm. This diameter may more particularly be between 10 nm and 200 nm and even more particularly between 10 nm and 100 nm. This porosity is measured by the known nitrogen and mercury techniques.

The precursor compound of the invention may have a number of additional features.

Thus, another feature of the precursor compound of the invention is its nitrogen purity. The nitrogen content of this compound may be at most 1%, which content is expressed as the mass of nitrogen relative to the total mass of the compound. This content may be more particularly at most 0.6%. The nitrogen content is measured by melting a specimen in a resistance heating oven and measuring the thermal conductivity.

According to other embodiments, the precursor compound of the invention may also have a high purity in terms of other elements.

Thus, it may have a carbon content of at most 0.5%, more particularly at most 0.2%.

According to another embodiment, it may also have a chlorine content of at most 10%, more particularly at most 5%.

Finally, according to another embodiment, it may also have a sulfur content of at most 0.05%, more particularly at most 0.01%.

The carbon content and the sulfur content are measured by the combustion of a specimen in a resistance heating oven and by detection using an infrared system. The chlorine content is measured by the X-ray fluorescence technique.

With regard to the values given above, the contents are all expressed in % by weight of the element in question relative to the total weight of the compound.

Of course, the precursor compound of the invention, apart from the nitrogen content given above, may have at the same time the abovementioned carbon, chlorine and sulfur contents.

The precursor compound generally has a BET specific surface area of at least 75 m$^2$/g, which may be for example between 75 m$^2$/g and 200 m$^2$/g.

The precursor compound of the invention may furthermore be characterized by its calcination behavior. Thus, its crystallographic structure changes as a result of a calcination. Generally, its transition alumina structure is transformed into another structure at a relatively low temperature, this structure and this temperature depending on the composition of the precursor of the invention.

Thus, for compounds of formula (1) or (2) and in the case in which b=0, the structure of the aluminate obtained after calcination is of the tridimite type. For compounds of formula (2) with b=1 or b=0, the structure of the aluminate obtained from the calcination is of the magnetoplumbite type or garnet type, respectively.

In the particular case of magnesium aluminate precursors of formula (1) in which the alkaline-earth metal is barium and for which a=b=1 and c=5 or 7 or for which a=1, b=2 and c=8, and also precursors of formula (3) in which b>0, for example products of formula $Ba_{0.9}Eu_{0.1}MgAl_{10}O_{17}$; $Ba_{0.9}Eu_{0.1}Mg_{0.8}MN_{0.2}Al_{10}O_{17}$ and $BaMgAl_{14}O_{23}$, the products resulting from the calcination have a beta-alumina structure or one derivated therefrom and this structure is obtained at a temperature of 1200° C. or thereabouts.

The aluminates resulting from the precursor compounds of the invention have the form of a pure crystallographic phase.

The term "pure" is understood to mean that the X-ray analysis is able to detect only a single phase and unable to detect the presence of phases other than the tridimite, magnetoplumbite, garnet or beta-alumina phases for example.

As an advantageous property of the precursor of the invention, it is also found that, during calcination, the compound of the invention retains its spherical morphology. There is no sintering of the spherical particles among themselves. The dispersion index of the particles is also maintained. Finally, the particle size varies only slightly. The $d_{50}$ may for example increase by at most 2 μm or 1 μm.

Without wishing to be tied down by one theory, it is believed that this property is the consequence of the existence of a certain porosity inside the particles, said porosity coming from the abovementioned presence of pores with a mean diameter of at least 10 nm. The absence of particle sintering may be demonstrated by the micrograph, but most particularly it is confirmed by the fact that no macroporosity is observed in the product after calcination. In fact, in the case of the products of the prior art, porosimetry shows that there is porosity coming from pores with a mean diameter of around 50 000 nm or a diameter of between 25 000 and 90 000 nm, which in fact corresponds to the spaces between the agglomerated particles.

The invention also relates to alkaline-earth or rare-earth metal aluminates, especially barium-magnesium aluminates, which may where appropriate exhibit luminescence properties. These aluminates are obtained by calcining the compound of the invention at a high enough temperature to obtain the beta-alumina phase, for example at least 1200° C. in the case of barium-magnesium aluminates and in a reducing atmosphere when it is desired to obtain a phosphor and when the substituents must be in reduced form.

The aluminate obtained after this calcination may, depending on the calcination conditions, have the same morphological characteristics (spherical particles, particle size, dispersion index) as those described above in the case of the precursor compound, the same composition and the same purity in terms of nitrogen, carbon, chlorine and sulfur. The values given above relating to the morphology, the composition and the purity and relating to the precursor compound therefore also apply here to the aluminate. This aluminate is in the form of a pure beta-alumina phase. In the case of the products containing europium, the latter may be present in $Eu^{2+}$ form. In this case and under excitation at below a wavelength of less than 380 nm, the aluminate may emit in the blue (450 nm).

The method of preparing the precursor compound of the invention will now be described.

As indicated above, this method includes a first step in which a liquid mixture is formed, this being a solution or a suspension or a gel of the aluminum compounds and of the other elements involved in the composition of the precursor compound.

As compounds of these elements, it is common practice to use inorganic salts or hydroxides. As salts, preferably nitrates may be mentioned, especially in the case of barium, aluminum, europium and magnesium. Sulfates, especially in the case of aluminum, chlorides or else organic salts, for example acetates, may optionally be employed.

It is also possible to use, as aluminum compound, a colloidal dispersion or sol of aluminum or aluminum oxide. Such a colloidal aluminum dispersion may have particles or colloids whose size lies between 1 nm and 300 nm. The aluminum oxide may be present in the sol in boehmite form.

The next step consists in drying the mixture prepared beforehand. This drying is performed by spraying.

The expression "spray drying" is understood to mean drying by spraying the mixture into a hot atmosphere. The spraying may be performed by means of any sprayer known per se, for example a spray nozzle of the sprinkler-rose type or another type. It is also possible to use atomizers called turbine atomizers. With regard to the various spraying techniques that can be used in the present method, reference may especially be made to the fundamental work by Masters entitled "*Spray drying*" (second edition, 1976, published by George Godwin, London).

It should be noted that it is also possible to employ the spray-drying operation by means of a "flash" reactor, for example of the type described in French Patent Applications Nos. 2 257 326, 2 419 754 and 2 431 321. This type of spray dryer may be used in particular to prepare products of small particle size. In this case, the treating gases (hot gases) are given a helical motion and flow into a vortex well. The mixture to be dried is injected along a path coincident with the axis of symmetry of the helical paths of said gases, thereby allowing the momentum of the gases to be completely transferred to the mixture to be treated. In fact, the gases thus fulfill two functions: firstly, the function of spraying the initial mixture, that is to say converting it into fine droplets, and secondly, the function of drying the droplets obtained. Moreover, the extremely short residence time (generally less than about 1/10th of a second) of the particles in the reactor has the advantage, among others, of limiting any risk of them being overheated as a result of being in contact with the hot gases for too long a time.

With regard to the flash reactor mentioned above, reference may especially be made to FIG. 1 of French Patent Application 2 431 321.

This consists of a combustion chamber and a contact chamber composed of a double cone or a truncated cone whose upper part diverges. The combustion chamber runs into the contact chamber via a narrow passage.

The upper part of the combustion chamber is provided with an opening allowing the combustible phase to be introduced.

Moreover, the combustion chamber includes a coaxial internal cylinder, thus defining, inside the combustion chamber, a central region and an annular peripheral region, having perforations located mostly toward the upper part of the apparatus. The chamber has a minimum of six perforations distributed over at least one circle, but preferably over several circles which are spaced apart axially. The total surface area of the perforations located in the lower part of the chamber may be very small, of the order of 1/10th to 1/100th of the total surface area of the perforations of said coaxial internal cylinder.

The perforations are usually circular and of very small thickness. Preferably, the ratio of the perforation diameter to the wall thickness is at least 5, the minimum wall thickness being only limited by the mechanical requirements.

Finally, an angled pipe runs into the narrow passage, the end of which opens along the axis of the central region.

The gas phase undergoing a helical motion (hereinafter called the helical phase) consists of a gas, generally air, introduced into an orifice made in the annular region, this orifice preferably being located in the lower part of said region.

To obtain a helical phase in the narrow passage, the gas phase is preferably introduced at low pressure into the aforementioned orifice, that is to say at a pressure of less than 1 bar and more particularly at a pressure of between 0.2 and 0.5 bar above the pressure existing in the contact chamber. The velocity of this helical phase is generally between 10 and 100 m/s and preferably between 30 and 60 m/s.

Moreover, a combustible phase, which may especially be methane, is injected axially via the aforementioned opening into the central region at a velocity of about 100 to 150 m/s.

The combustible phase is ignited, by any known means, in that region where the fuel and the helical phase come into contact with each other.

Thereafter, the flow imposed on the gases in the narrow passage takes place along a number of paths coincident with families of generatrices of a hyperboloid. These generatrices are based on a family of small-sized circles or rings located close to and below the narrow passage, before diverging in all directions.

Next, the mixture to be treated in liquid form is introduced via the aforementioned pipe. The liquid is then divided into a multitude of drops, each drop being transported by a volume of gas and subjected to a motion creating a centrifugal effect. Usually, the flow rate of the liquid is between 0.03 and 10 m/s.

The ratio of the proper momentum of the helical phase to that of the liquid mixture must be high. In particular, it is at least 100 and preferably between 1000 and 10000. The momenta in the narrow passage are calculated based on the input flow rates of the gas and of the mixture to be treated, and on the cross section of said passage. Increasing the flow rates increases the size of the drops.

Under these conditions, the proper motion of the gases is imposed, both in its direction and its intensity, on the drops of the mixture to be treated, these being separated from one another in the region of convergence of the two streams. The velocity of the liquid mixture is, in addition, reduced to the minimum needed to obtain a continuous flow.

The spray-drying is generally carried out with a solid output temperature of between 100° C. and 300° C.

The final step of the method consists in calcining the product obtained from the drying.

The calcination is carried out at a temperature of between 700° C. and 950° C., more particularly between 700° C. and 900° C. A temperature below 700° C. could not produce the compound of the invention in an essentially transition-alumina crystallized form. Above 950° C., there is a risk of parasitic phases appearing, which might remain in the aluminate obtained from the precursor.

The duration of the calcination is chosen to be long enough to obtain the product in the essentially transition-alumina crystallized form and with nitrogen contents and contents of the other elements (C, S and Cl) that are given above. For example, the duration may thus be between 10 minutes and 5 hours and is shorter the higher the calcination temperature.

The calcination is generally carried out in air.

The precursor compound of the invention is obtained from this calcination.

As described above, an aluminate may be obtained from this compound by calcining it. This calcination must be carried out at a high enough temperature for the product that results therefrom to be in particular in the desired structure. In the case of barium-magnesium aluminates, this temperature is at least 1200° C. This calcination may be carried out in air or, preferably when it is desired to obtain a phosphor, in a reducing atmosphere, for example in hydrogen mixed with nitrogen. In the case of europium as substituent, it thus changes to the oxidation state 2. The duration of this calcination is for example about 2 hours.

This calcination may be carried out with or without a flux. Examples of suitable fluxes that may be mentioned include in particular lithium fluoride, aluminum fluoride, magnesium fluoride, lithium chloride, aluminum chloride, magnesium chloride, potassium chloride, ammonium chloride and boron oxide, this list of course not being in any way exhaustive. The flux is mixed with the product and then the mixture is heated to the chosen temperature.

An aluminate having the same morphology as the precursor compound of the invention may be obtained by calcining without flux, or else a product in the form of platelets by calcining with a flux in the case of products having a beta-alumina structure.

The aluminates thus obtained may be used as phosphors. Thus, they may be used in the manufacture of any device that incorporates phosphors, such as plasma display screens, trichromatic lamps and light-emitting diodes.

As examples of the abovementioned products, it is possible to use in lamps those of formulae: $Ba_{0.9}Eu_{0.1}MgAl_{10}O_{17}$; $Ba_{0.9}Eu_{0.1}Mg_{0.8}Mn_{0.2}Al_{10}O_{17}$; $Ba_{0.8}Eu_{0.2}Mg_{1.93}Mn_{0.07}Al_{16}O_{27}$; $Ce_{0.67}Tb_{0.33}MgAl_{11}O_{19}$ and $Sr_{3.9}Eu_{0.1}Al_{14}O_{25}$. For plasma display screens, the following are especially useful: $Ba_{0.9}Eu_{0.1}MgAl_{10}O_{17}$; $Sr_{0.99}Eu_{0.01}Al_2O_4$; $Ca_{0.99}Eu_{0.01}Al_2O_4$; and $Ba_{0.98}Mn_{0.02}Al_{12}O_{19}$. The products of formula:

$Sr_{0.98}Eu_{0.01}Dy_{0.01}Al_2O_4$; $Ca_{0.98}Eu_{0.01}Nd_{0.01}Al_2O_4$ and $Sr_{3.98}Eu_{0.01}Dy_{0.01}Al_{14}O_{25}$ may be used for their phosphorescence properties. For light-emitting diodes, the following products are also useful: $Ba_{0.9}Eu_{0.1}MgAl_{10}O_{17}$ and $Y_{2.99}Ce_{0.01}Al_5O_{12}$. In lasers, $Y_{2.99}Nd_{0.01}Al_5O_{12}$ may be employed and, as scintillators, $Y_{2.99}Tb_{0.01}Al_5O_{12}$ may be used in projection screens.

Finally, the invention relates to plasma display screens or field-emission (microtip) display screens, light-emitting diodes and trichromatic lamps containing these aluminates as phosphors.

In the manufacture of the devices described above, these phosphors are applied using well-known techniques, for example by screen printing, electro-phoresis or sedimentation.

An example will now be given.

For this example, the following measurement methods were employed.

Analysis of the Carbon and Sulfur Contents

An LECO CS 444 analyzer was used to determine, simultaneously, the total carbon content and the overall sulfur content by a technique involving combustion in an induction furnace in oxygen and detection by an infrared system.

The specimen (standard or unknown specimen) is introduced into a ceramic crucible in which a LECOCEL-type accelerator and an IRON-type flux (for analysis of unknown specimens) are added. The specimen is melted at high temperature in the furnace, and the combustion gases are filtered over a metal gauze and then they pass over a series of reactants. After the moisture trap outlet, the $SO_2$ is detected using a first infrared cell. The gases then flow through a catalyst (platinized silica gel) which converts the CO into $CO_2$ and the $SO_2$ into $SO_3$. The latter is trapped by cellulose and the $CO_2$ is detected using two infrared cells.

Analysis of the Nitrogen Content

An LECO TC-436 analyzer was used to determine the nitrogen content by a technique that involves melting in a resistance heating furnace. The nitrogen content is measured by thermal conductivity.

The analysis is carried out in two stages:
  degassing of the empty crucible: an empty graphite crucible is placed between the two electrodes of the furnace. A stream of helium purges the crucible of the atmosphere gases and isolates it therefrom. A large electric current is applied through the crucible, this having the effect of heating the latter to very high temperatures;
  analysis of the specimen: the weighed specimen, introduced into the loading head, drops into the degassed empty crucible. A further application of a large electric current through the crucible results this time in the specimen being melted. The nitrogen is then detected by a thermal conductivity cell.

Laser Scattering Particle Size Analysis

The measurements are made on a Coulter LS 230 light scattering analyzer (standard module) combined with a 450 W (power 7) ultrasonic probe. The specimens are prepared in the following manner: 0.3 g of each specimen is dispersed in 50 ml of purified water. The suspension thus prepared is subjected to ultrasound for 3 minutes. One aliquot part of the suspension as such and deagglomerated is introduced into the vessel so as to obtain correct obscuration. The optical model used for the measurements is: n=1.7 and k=0.01.

Porosity Measurement

Two techniques are used to be able to measure the pore domains ranging from 2 nm to several hundred microns.

The first is a mercury porosity measurement using, as apparatus, an Autopore 9420 porosimeter from Micromeritics configured with an Hg contact angle of 140°. Before the porosity measurement, the powder is degassed for 2 h at 200° C. in an oven.

A nitrogen technique is also used, employing, as apparatus, a Tristar 3000 porosimeter from Micromeritics and a VAC PREP degassing rig from Micromeritics. Before the porosity measurement, the powder is degassed for 4 h at 200° C.

EXAMPLE 1

This example relates to the synthesis of a barium aluminate precursor of formula $Ba_{0.9}Eu_{0.1}MgAl_{10}O_{17}$.

The raw materials used were a boehmite sol (specific surface area of 265 m²/g) containing 0.157 mol Al per 100 g of gel, a 99.5% barium nitrate, a 99% magnesium nitrate and a europium nitrate solution containing 2.102 mol/l of Eu (d=1.5621 g/ml). 200 ml of boehmite sol were made (i.e. 0.3 mol of Al). Moreover, the salt solution (150 ml) contained: 7.0565 g of $Ba(NO_3)_2$; 7.9260 g of $Mg(NO_3)_2$ and 2.2294 g of the $Eu(NO_3)_3$ solution. The final volume was made up to 405 ml (i.e. 2% of Al). After mixing the sol with the salt solution, the final pH was 3.5. The mixture obtained was spray-dried in an APV® spray drier with an outlet temperature of 145° C. The dried powder was calcined at 900° C. for 2 hours in air.

The power thus obtained was white. It satisfied the chemical composition $Ba_{0.9}Eu_{0.1}MgAl_{10}O_{17}$.

The particles were spherical, having a $d_{50}$ of 10.4 μm, and had a dispersion index of 0.6 (laser Coulter counter).

Figure 3:
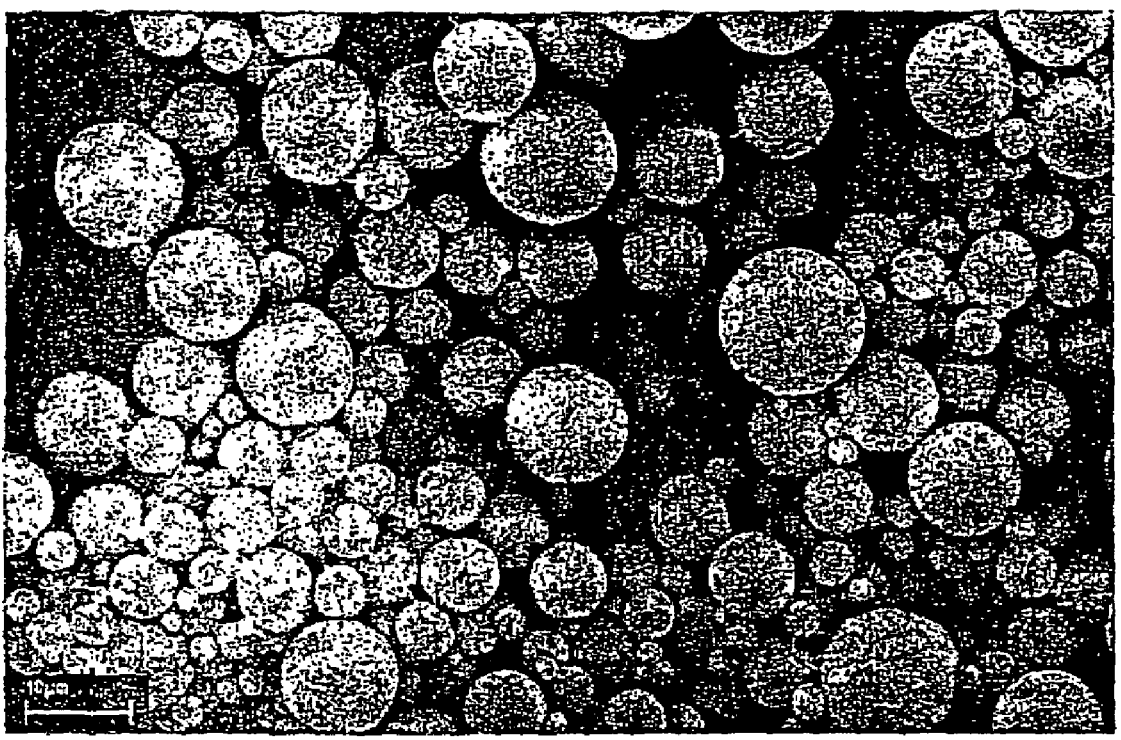
FIG. 3 is an SEM (scanning electron microscopy) photograph of a precursor compound of the invention.

The product had a gamma-alumina structure (XRD). The product emitted in the red, the emitter being $Eu^{3+}$. The XD diagram corresponded to that of FIG. 1. The photograph in FIG. 3 clearly shows the spherical appearance of the particles constituting the product.

It had a nitrogen content of 0.39% (measured on the LECO TC 436 analyzer), a sulfur content of less than 0.01% and a carbon content of 0.09% (the latter two contents being measured on a LECO CS 444 analyzer). The porograms obtained by the porosimetry measurements gave a mean pore diameter of 10 nm.

After the powder was calcined at 1200° C. for 2 hours in argon, a product again in the form of a white powder was obtained. This powder consisted of spherical particles, having a $d_{50}$ of 9.7 μm, with a dispersion index of 0.5 (laser Coulter counter).

Figure 2:
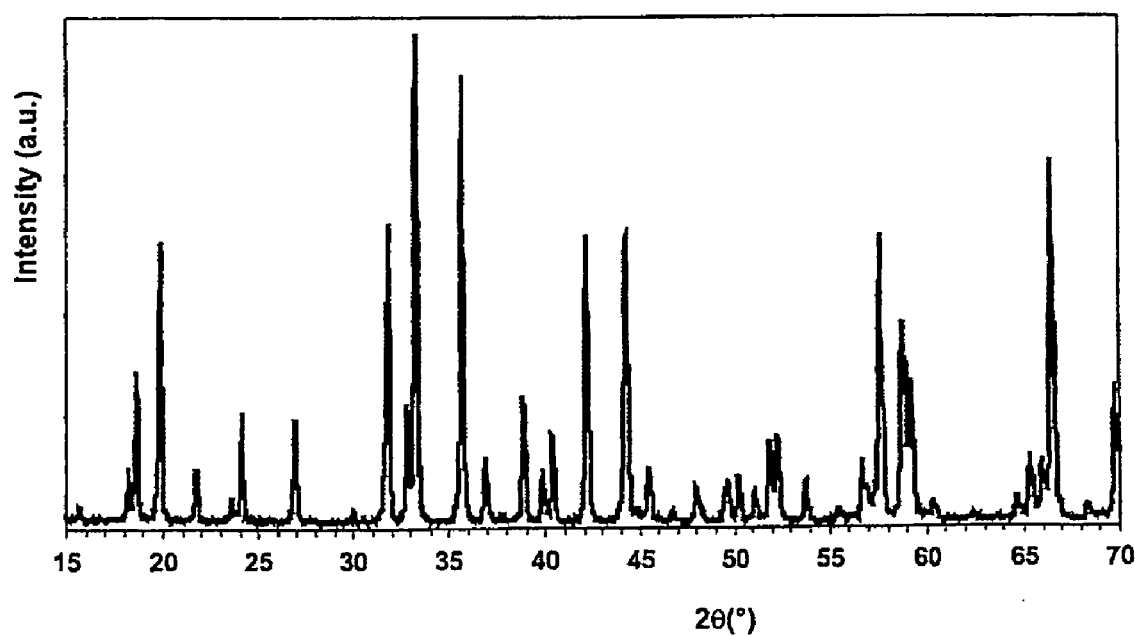
FIG. 2 is an X-ray diagram of an aluminate obtained by calcination of a precursor compound according to the invention.
Figure 4:
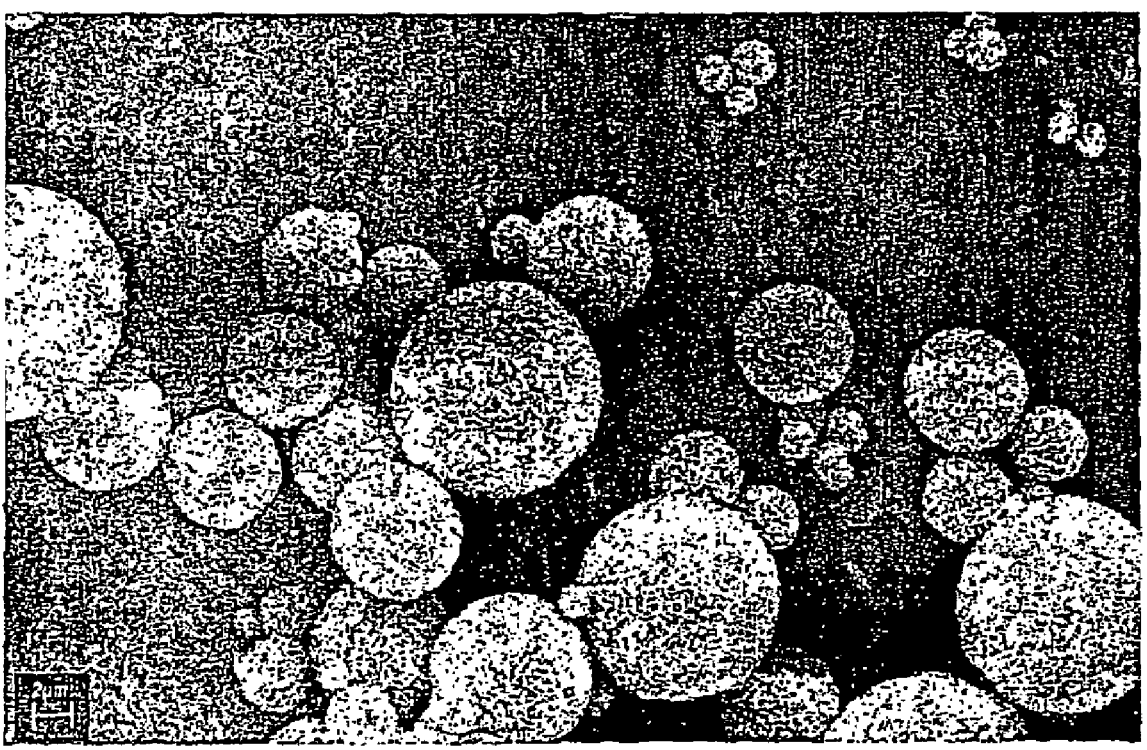
FIG. 4 is an SEM photograph of an aluminate according to the invention.

The product had a beta-alumina structure (XRD). The X-ray diagram corresponded to that of FIG. 2. The photograph in FIG. 4 clearly shows the spherical appearance of the particles constituting the product.

The product emitted in the blue, the emitter being $Eu^{2+}$ (emission at 450 nm).

The luminous efficiency was at least equal to that of products obtained by solid-solid reaction (grogging) and it was at least 20% or even 30% higher than that of products obtained by aerosol pyrolysis.

EXAMPLE 2

This example relates to the preparation of various products.

This preparation was carried out according to the operating method of Example 1, especially based on the same boehmite sol. The various elements forming the composition of the products (rare earth metals and alkaline-earth metals) were supplied in nitrate form in the quantities needed to obtain stoichiometry of the desired composition. As in Example 1, the salt solutions and the sol were mixed together, and this mixture was topped up with the volume of water needed to obtain complete dissolution of the salts.

The mixture was spray-dried. using a BUCHI spray drier with an outlet temperature of 120° C. The dried powder was calcined at 900° C. for 2 hours in air.

The precursors were then calcined at various temperatures in order to obtain the corresponding phosphor.

The table below gives the compositions prepared, the particle size characteristics of the precursors, the precursor calcination temperature for obtaining the corresponding phosphors and the phosphor emission color at the wavelength indicated.

| Composition | Particle size analysis | | Calcination temperature | Emission color (wavelength in |
|---|---|---|---|---|
| | $d_{50}$ | $\sigma/m$ | (° C.) | nm) |
| $Ce_{0.67}Tb_{0.33}Al_{11}O_{19}$ | 4.69 | 0.53 | 1400 | Green (254) |
| $Sr_{0.98}Eu_{0.01}Dy_{0.01}Al_2O_4$ | 4.49 | 0.71 | 1300 | Green (visible) |
| $Sr_{3.92}Eu_{0.04}Dy_{0.04}Al_{14}O_{25}$ | 9.66 | 0.52 | 1300 | Turquoise blue (visible) |

The product $Ce_{0.67}Tb_{0.33}Al_{11}O_{19}$ is luminescent, while the other two are phosphorescent.

The invention claimed is:

1. An alkaline-earth or rare-earth metal aluminate precursor compound, characterized in that it has the following characteristics:

it has a composition given by the formulae:

$$a(M^1O).b(MgO).c(Al_2O_3) \quad (1)$$

or $$a(M^2O_{1.5}).b(MgO).c(Al_2O_3) \quad (2)$$

in which $M^1$ denotes an alkaline-earth metal and $M^2$ denotes yttrium or a combination of cerium and terbium, and a, b and c are integers or nonintegers that satisfy the relationships:

$0.25 \leq a \leq 4$; $0 \leq b \leq 2$ and $0.5 \leq c \leq 9$;

it is crystallized in the form of an alumina having a transitional alumina crystal structure;

it is in the form of substantially spherical and chemically homogeneous particles; and these particles include pores, the mean diameter of which is at least 10 nm.

2. The compound as claimed in claim 1, having a nitrogen content of at most 1%.

3. The compound as claimed in claim 1, wherein it satisfies formula (1), $M^1$ denoting barium, strontium or calcium.

4. The compound as claimed in claim 1, wherein in formula (1), a=1, b=0 and c=1, 6 or 7.

5. The compound as claimed in claim 1, wherein in formula (1), a=b=1 and c=5 or 7, $M^1$ being barium.

6. The compound as claimed in claim 1, wherein in formula (1), a=1, b=2 and c=8, $M^1$ being barium.

7. The compound as claimed in claim 1, wherein in formula (2), a=3, b=0 and c=2.5, and where $M^2$ is yttrium.

8. The compound as claimed in claim 1, wherein in formula (2), a=b=1 and c=5.5.

9. The compound as claimed in claim 1, wherein $M^1$ or $M^2$ is partially substituted with at least one rare earth metal.

10. The compound as claimed in claim 1, wherein the magnesium is partially substituted with at least one element chosen from zinc and manganese.

11. The compound as claimed in claim 1, wherein the aluminum is partially substituted with at least one element which is gallium, scandium, boron, germanium and silicon.

12. The compound as claimed in claim 1, wherein the particles have a mean diameter of between 1.5 µm and 20 µm.

13. The compound as claimed in claim 1, wherein the particles have a dispersion index of at most 0.8.

14. The compound as claimed claim 1, having a nitrogen content of at most 0.6%.

15. The compound as claimed in claim 1, having a carbon content of at most 0.5%.

16. The compound as claimed in claim 1, having a chlorine content of at most 10%.

17. The compound as claimed in claim 1, having a sulfur content of at most 0.05%.

18. The compound as claimed in claim 1, wherein in formula (1), the alkaline-earth metal is barium and in which a=b=1 and c=5 or 7 or in which a=1, b=2 and c=8, and wherein said alumina is capable of forming a beta-alumina structure upon calcination.

19. The compound as claimed in claim 1, wherein the mean pore diameter of the particles is between 10 nm and 100 nm.

20. A method of preparing a precursor compound as claimed in claim 1, comprising the steps of:

a) forming a liquid mixture comprising aluminum compounds and compounds of the other elements involved in the precursor composition;

b) spray-drying said mixture into a dried product; and c) calcining the dried product at a temperature of between 700° C. and 950° C.

21. The compound as claimed in claim 1, having a chlorine content of at most 5%.

22. The compound as claimed in claim 1, having a sulfur content of at most 0.01%.

23. The compound as claimed in claim 15, having a carbon content of at most 0.2%.

24. The compound as claimed in claim 9, wherein the rare earth metal comprises europium, neodymium or dysprosium.

25. The compound as claimed in claim 1, wherein the pores have a mean diameter of 10 nm-200 nm.

26. An aluminate precursor compound comprising a composition according to formula (3):

$$a(Ba_{1-d}Eu_d).b(MgO).c(Al_2O_3);$$

wherein a, b, c and d satisfy the relationships:

$0.25 \leq a \leq 2$; $0 \leq b \leq 2$; $3 \leq c \leq 9$; and $0.01 \leq d \leq 0.3$;

wherein the compound is crystallized in the form of a transition alumina, is in the form of substantially spherical and chemically homogenous particles, and the particles have pores with a mean diameter of at least 10 nm.

27. The compound as claimed in claim 26, wherein the precursors of formula (3) have b>0, and said alumina is capable of forming a beta alumina structure upon calcination.

28. A method of forming an aluminate having a crystallographic phase, the method comprising:

calcining the precursor compound of claim 1.

* * * * *